(12) United States Patent
Bankovic et al.

(10) Patent No.: US 11,274,764 B2
(45) Date of Patent: Mar. 15, 2022

(54) VALVE BODY ELEMENT HAVING GEOMETRY CONFIGURED TO BE FORMED VIA POWDER METAL COMPACTION

(71) Applicant: American Axle & Manufacturing, Inc., Detroit, MI (US)

(72) Inventors: Daniel R. Bankovic, Kersey, PA (US); Thomas George Kaveney, II, St. Marys, PA (US); Joshua J. Shelander, St. Marys, PA (US)

(73) Assignee: American Axle & Manufacturing, Inc., Detroit, MI (US)

( * ) Notice: Subject to any disclaimer, the term of this patent is extended or adjusted under 35 U.S.C. 154(b) by 0 days.

(21) Appl. No.: 17/342,709

(22) Filed: Jun. 9, 2021

(65) Prior Publication Data

US 2021/0404574 A1    Dec. 30, 2021

(51) Int. Cl.
*F16K 27/10* (2006.01)
*B22F 3/12* (2006.01)

(52) U.S. Cl.
CPC .............. *F16K 27/10* (2013.01); *B22F 3/12* (2013.01)

(58) Field of Classification Search
CPC ........... F16K 27/10–107; F16K 27/003; F16K 27/0281; F16K 1/48; F16K 1/482; F16K 1/485; F16K 47/00; F16K 47/01; F16K 47/02; F16K 47/04; F16K 47/08; B22F 3/12; F16L 55/02736
USPC ................................... 251/367–368; 138/42; 29/888.4–888.453, 888.03, 890.12, 29/DIG. 85, DIG. 31; 137/315.33, 137/315.27, 315.28, 329.01–329.06
See application file for complete search history.

(56) References Cited

U.S. PATENT DOCUMENTS

| 2,675,830 | A | * | 4/1954 | Jean | ...................... F16K 11/074 137/625.21 |
| 4,909,276 | A | * | 3/1990 | Bayly | ...................... A47J 27/09 137/467 |
| 5,286,001 | A | * | 2/1994 | Rafeld | ................... B29C 66/522 251/366 |
| 5,819,782 | A | * | 10/1998 | Itafuji | ................. F15B 13/0807 137/240 |
| 5,927,688 | A | * | 7/1999 | Lin | ........................... A47C 3/30 251/319 |
| 6,378,542 | B1 | * | 4/2002 | DuHack | .................. F16K 47/02 137/8 |

(Continued)

*Primary Examiner* — Craig J Price
(74) *Attorney, Agent, or Firm* — Burris Law, PLLC (57) ABSTRACT

A valve body element having a central bore. The valve body element includes first and second structures that are each formed of a compacted powdered metal material. The first structure has a plurality of L-shaped first passage portions that extend radially outwardly from a first portion of the central bore and intersect an axial end of the first structure. The second structure defines a remaining portion of the central bore and includes a flange. The flange defines a joining section, into which the axial end of the first structure is received, and a plurality of second passage portion. Each of the second passage portions is coupled in fluid communication to a corresponding one of the first passage portions. The remaining portion of the central bore in the second structure is in fluid communication with the first bore portion of the central bore in the first structure.

13 Claims, 5 Drawing Sheets

(56) References Cited

U.S. PATENT DOCUMENTS

| | | | |
|---|---|---|---|
| 8,511,586 B2 * | 8/2013 | Einav | A01G 25/023 |
| | | | 239/542 |
| 8,542,006 B2 | 9/2013 | Liu | |
| 10,352,729 B2 | 7/2019 | Suntharalingam | |
| 2006/0233657 A1 * | 10/2006 | Bonear | F04C 28/28 |
| | | | 418/55.6 |
| 2011/0315003 A1 * | 12/2011 | Caldwell | F16K 47/08 |
| | | | 91/418 |
| 2017/0086624 A1 * | 3/2017 | Eveleigh | A61H 35/02 |

* cited by examiner

VALVE BODY ELEMENT HAVING GEOMETRY CONFIGURED TO BE FORMED VIA POWDER METAL COMPACTION

CROSS-REFERENCE TO RELATED APPLICATIONS

This application claims the benefit of U.S. Provisional Application No. 63/044,458 filed Jun. 26, 2020, the disclosure of which is incorporated by reference as if fully set forth in detail herein.

FIELD

The present disclosure relates to a valve body element having a geometry that is configured to be formed via compacted powered metal molding.

BACKGROUND

This section provides background information related to the present disclosure which is not necessarily prior art.

Powder Metal Compaction is a manufacturing process in which a metal powder is compacted by uniaxial force in a closed die and related tooling and sintered to form a high strength component. The process is commonly employed to fabricate components in a way that some or all of the features of the component are net formed (i.e., formed to a finished size so that no machining is necessary). The configuration of the several features that can be net formed on a component is limited by considerations for the complexity of the die. In some instances, a feature may not be capable of being net formed if a component of the die would be trapped in the component after the powdered metal material has been compacted in the die. In other instances, the feature may require the use of one or more pins or punches that move in a direction that is transverse to the main axis of consolidation. While it is possible to employ one or more of such transverse-oriented pins or punches, they are costly and moreover, it can be difficult or impossible to package multiple transverse-oriented pins or punches into a die when several of these features are required in a component.

SUMMARY

This section provides a general summary of the disclosure, and is not a comprehensive disclosure of its full scope or all of its features.

In one form, the present disclosure provides a valve body element having a central axis and defining a central bore. The valve body element includes first and second structures that are each formed of a compacted powered metal material. The first structure defines a first hub, a first bore portion of the central bore, and a plurality of first passage portions. The first hub extends along the central axis. The first bore portion of the central bore extends through the first hub and about the central axis. Each of the first passage portions is generally L-shaped and has a first leg and a second leg. Each of the first legs intersects the first bore portion of the central bore and extends radially outwardly therefrom. Each of the second legs extends radially outwardly from an associated one of the first legs. Each of the first passage portions intersects an axial end of the first hub. The second structure defines a second hub, a flange, a second bore portion of central bore, and a third bore portion of the central bore. The second bore portion extends along the central axis through the second hub. The second hub is fixedly coupled to and extends axially away from a first axial end of the flange. The flange defines a joining section and a plurality of second passage portions. The joining section extends through a second axial end of the flange that is opposite the first axial end of the flange. Each of the second passage portions intersects the joining section and extends through the first axial end of the flange. The first hub is received into the joining section. The first and second structures are fixedly coupled to one another. Each of the second passage portions is aligned to a radially outer end of a corresponding one of the second legs of the first passage portions. The first bore portion is in fluid communication with the second and third passage portions.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

With reference to FIGS. 1-4, a valve body element constructed in accordance with the teachings of the present disclosure is generally indicated by reference numeral 10. Generally speaking, the valve body element 10 has a hub 12 and a flange 14 that extends radially outwardly of the hub 12. The hub 12 can have a first hub portion 20, which can extend axially from a first side of the flange 14, and a second hub portion 22 that can be concentric with the first hub portion 20 and can extend axially from a second, opposite side of the flange 14. A central bore 24 is formed along a central axis 26 through the hub 12 and includes a first bore portion 30, a second bore portion 32, a third bore portion 34, a first transition portion 36, a second transition portion 38, and a chamfer portion 40. The first bore portion 30 is formed through a first axial end 44 of the hub 12 and is cylindrically shaped with a first diameter. The second bore portion 32 is formed through a second, opposite axial end 46 of the hub 12, is concentric with the first bore portion 30, and is cylindrically shaped with a second diameter that is smaller than the first diameter. The third bore portion 34 is disposed axially between the first and second bore portions 30 and 32, is concentric with the first bore portion 30, and is cylindrically shaped with a third diameter that is smaller than the second diameter. The first transition portion 36 is concentric with the first bore portion 30, extends between the first bore portion 30 and the third bore portion 34, and is frusto-conically shaped, with the larger end of the cone being adjacent to the first bore portion 30. The second transition portion 38 is concentric with the second bore portion 32, extends between the second bore portion 32 and the third bore portion 34, and is frusto-conically shaped, with the larger end of the cone being adjacent to the second bore portion 32. The chamfer portion 40 is concentric with the second bore portion 32, and is frusto-conically shaped, with the larger end of the cone intersecting the second axial end 46 of the hub 12. A seal groove 50, which can be sized to receive an O-ring (not shown) or other type of seal, can be formed into the outside circumferential surface of the first hub portion 20 proximate the first axial end 44 of the hub 12. A cross-hole 52 can be formed through the second hub portion 22 and can intersect the second bore portion 32.

Chamfers 54 can be formed on the outer edges of the flange 14 where first and second sides 60 and 62, respectively, of the flange 14 intersect the outside circumferential surface 64 of the flange 14. An annular pocket 66 can be formed into the second side of the flange 14. A plurality of passages 70 can be formed through the second side 62 of the flange 14. The passages 70 are spaced about the hub 12 and intersect the first bore portion 30.

Figure 5:
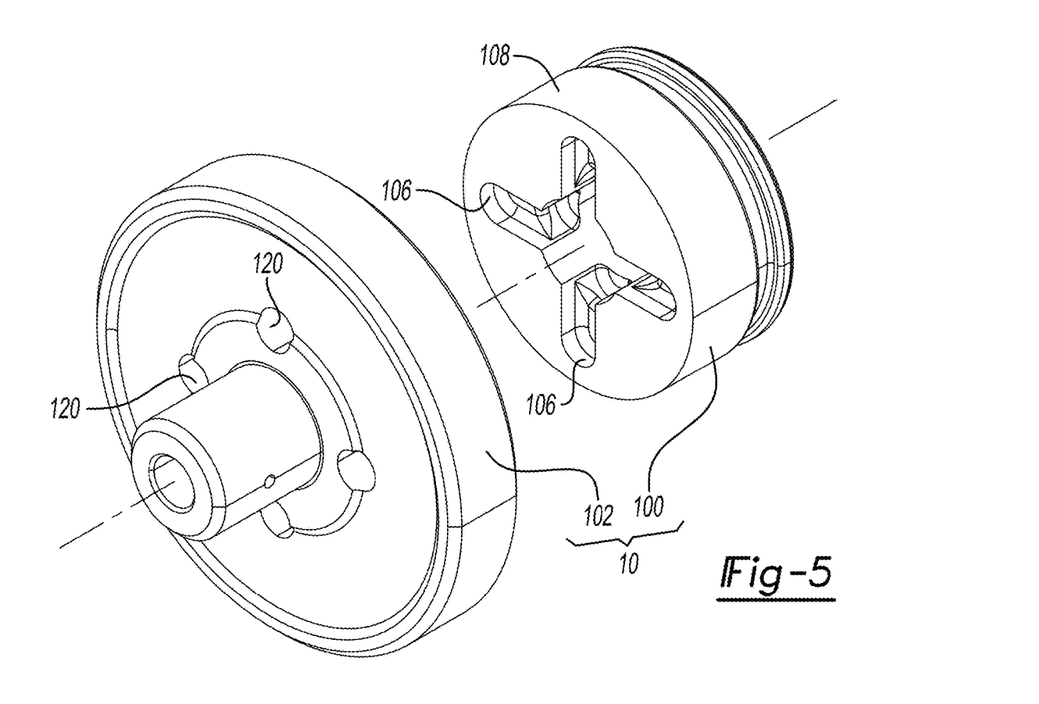
FIGS. 5 and 6 are exploded perspective views of the valve body element of FIG. 1 taken from the top and bottom sides, respectively.
Figure 6:
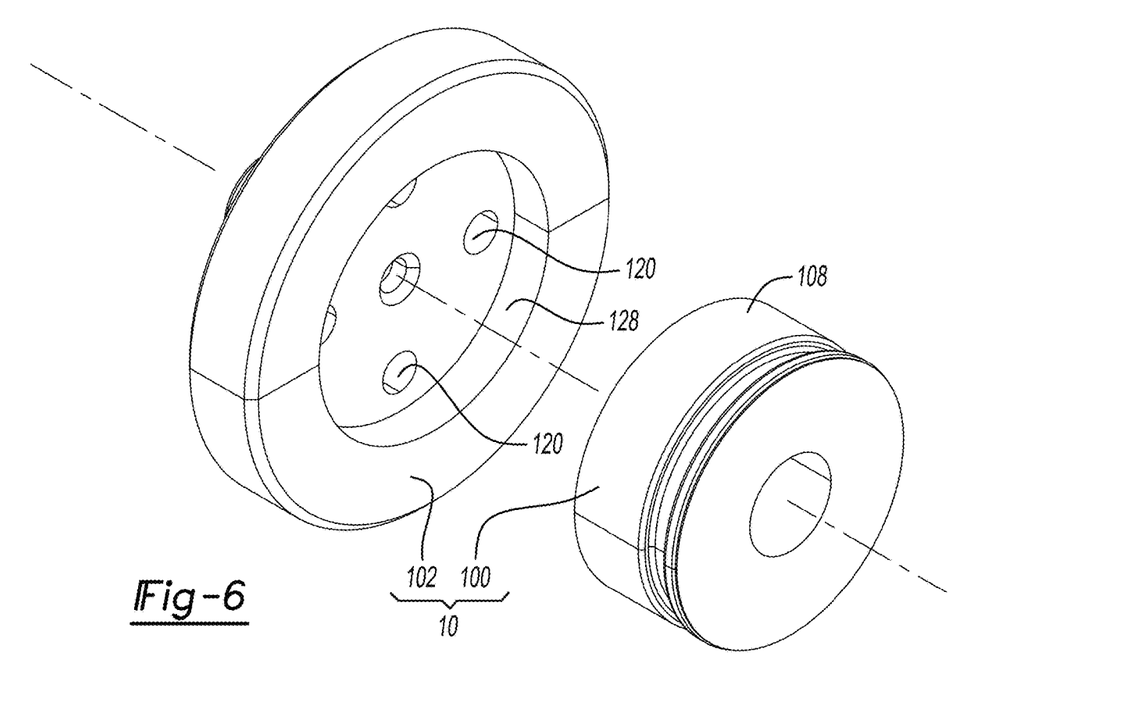

With reference to FIGS. 5 and 6, the valve body element 10 is formed in two discrete sections (i.e., a first structure 100 and a second structure 102) to facilitate the formation of the valve body element 10 from powdered metal and to simplify the dies (not shown) that are used for the formation of the valve body element 10. Each of the first and second structures 100 and 102 is formed of compacted powdered metal and are subsequently joined together to form the valve body element 10.

Figure 7:
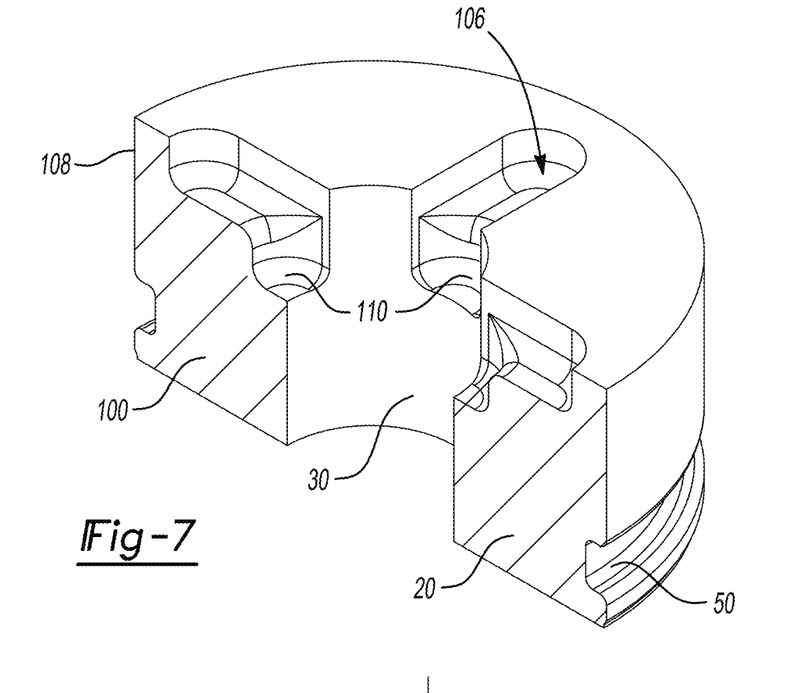
FIG. 7 is a longitudinally sectioned perspective view of a portion of the valve body element of FIG. 1, illustrating a first structure in more detail.
Figure 8:
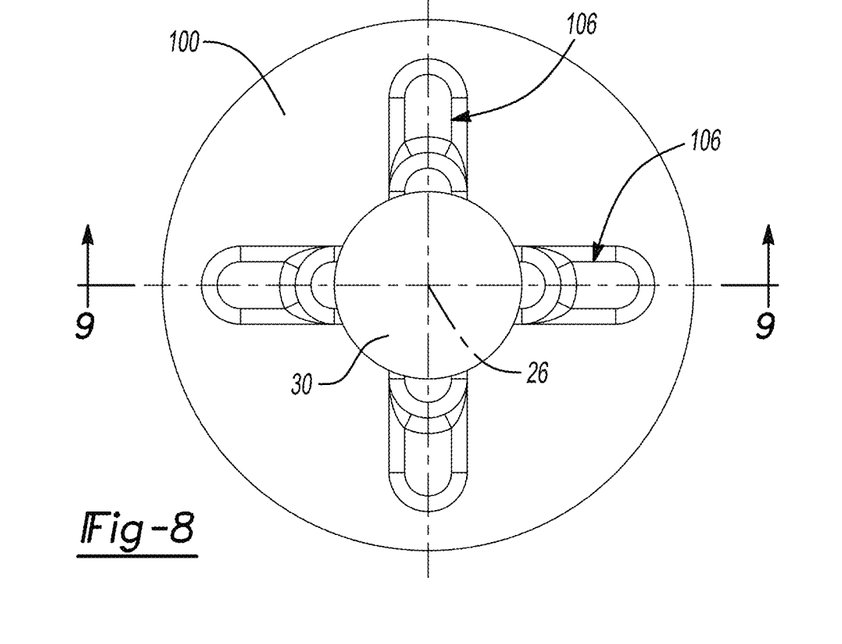
FIG. 8 is a top plan view of the first structure.
Figure 9:
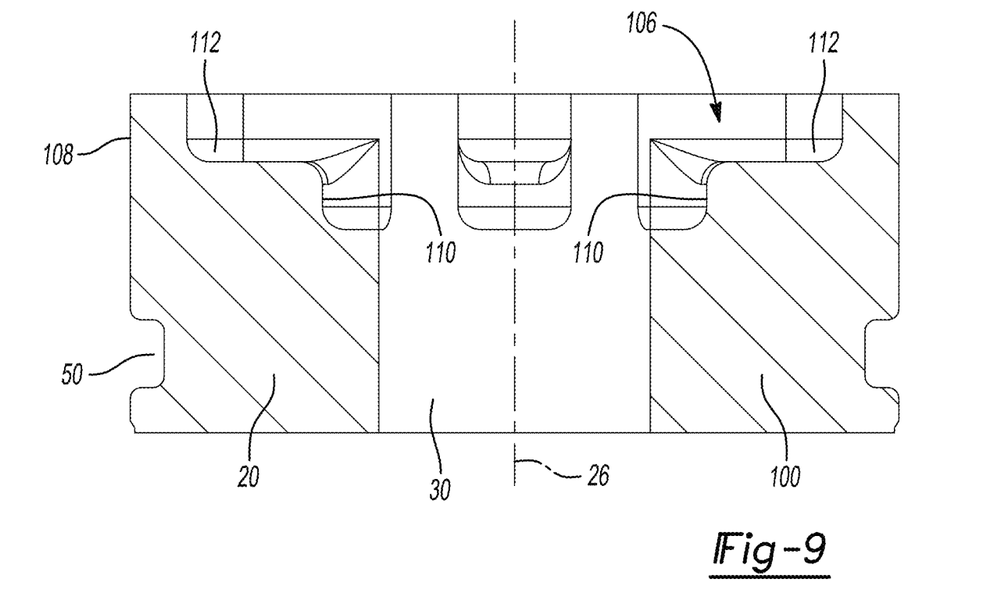
FIG. 9 is a section view taken along the line 9-9 of FIG. 8.

With reference to FIGS. 7-9, the first structure 100 is a hollow, generally cylindrically-shaped structure that forms the first hub portion 20, the seal groove 50, the first bore portion 30 of the central bore 24, first passage portions 106 of the passages 70 (FIG. 1) and a first joining section 108. In the particular example provided, a quantity of four of the first passage portions 106 are provided, the first passage portions 106 are spaced equally about the central axis 26, and each of the first passage portions 106 is generally L-shaped, having a first leg 110 and a second leg 112 that are formed into an axial end of the first structure 100. The first leg 110 is parallel to the central axis 26 and intersects the first bore portion 30 of the central bore 24, while the second leg 112 is perpendicular to the central axis 26 and extends radially outwardly from the first leg 110. The surfaces of the first and second legs 112 and 114 can be shaped in any desired manner. In the example shown, the radially outer surface of the first leg 110, the radially outer surface of the second leg 112 and the bottom surface of the second leg 112 are defined by a radius that is sized at one-half of the width of the first passage portion 106. While the first passage portion 106 has been illustrated as having a consistent width over its length, it will be appreciated that the first passage portion 106 could be shaped differently. For example, the end of the second leg 112 that intersects the first leg 110, along with the first leg 110, could be formed to be wider than the radially outer end of the second leg 112 such that the width of the second leg 112 tapers between its radially inner and outer ends.

It will be appreciated that the die for forming the first structure 100 can include a die body (not shown) that can be formed in two pieces that can move perpendicular to a longitudinal axis of the first structure 100, as well as a ram (not shown) that is movable along the longitudinal axis of the first structure 100.

Figure 1:
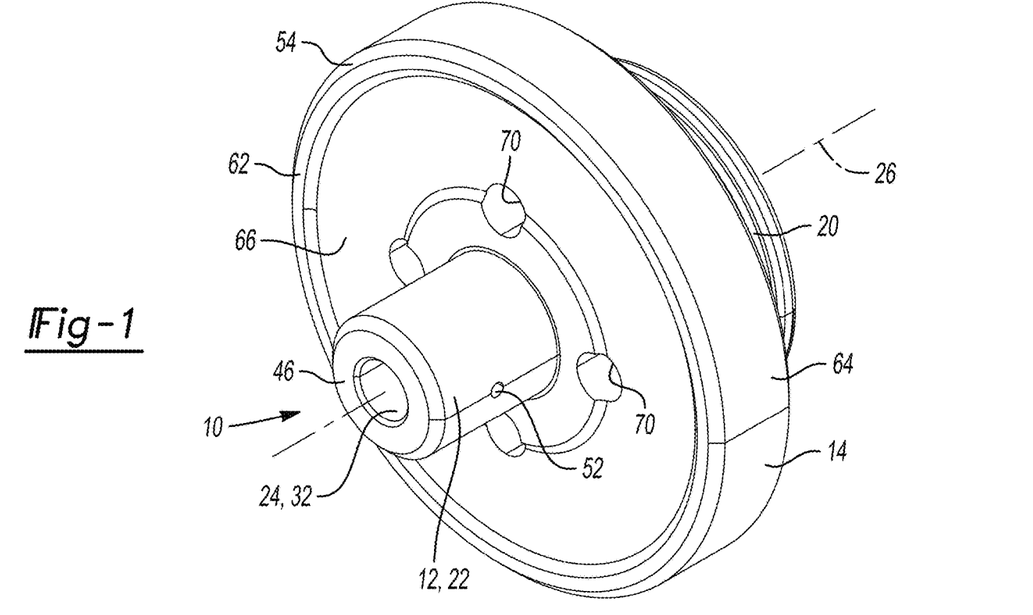
FIG. 1 is a top perspective view of an exemplary valve body element constructed in accordance with the teachings of the present disclosure.
Figure 2:
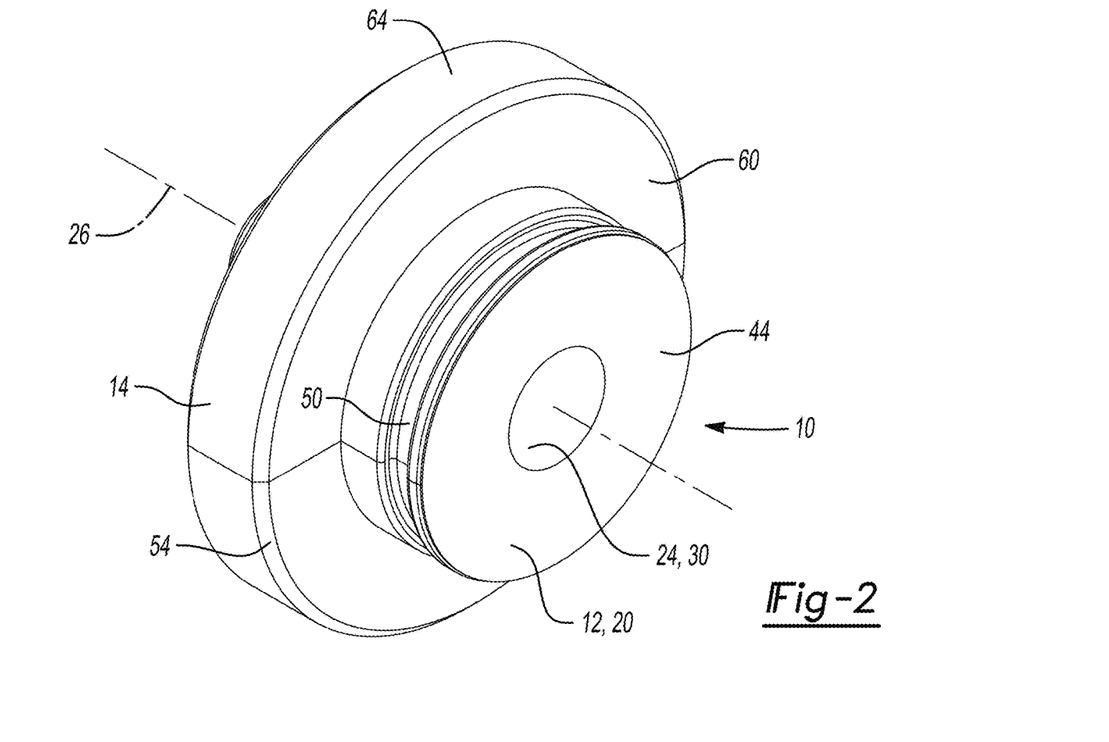
FIG. 2 is a bottom perspective view of the valve body element of FIG. 1.
Figure 3:
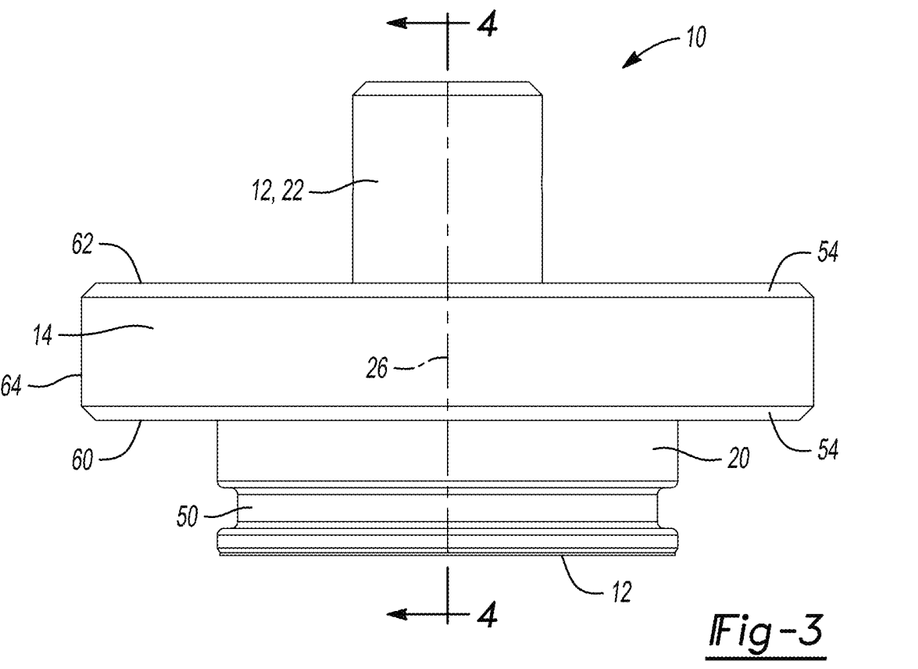
FIG. 3 is a side elevation view of the valve body element of FIG. 1.
Figure 4:
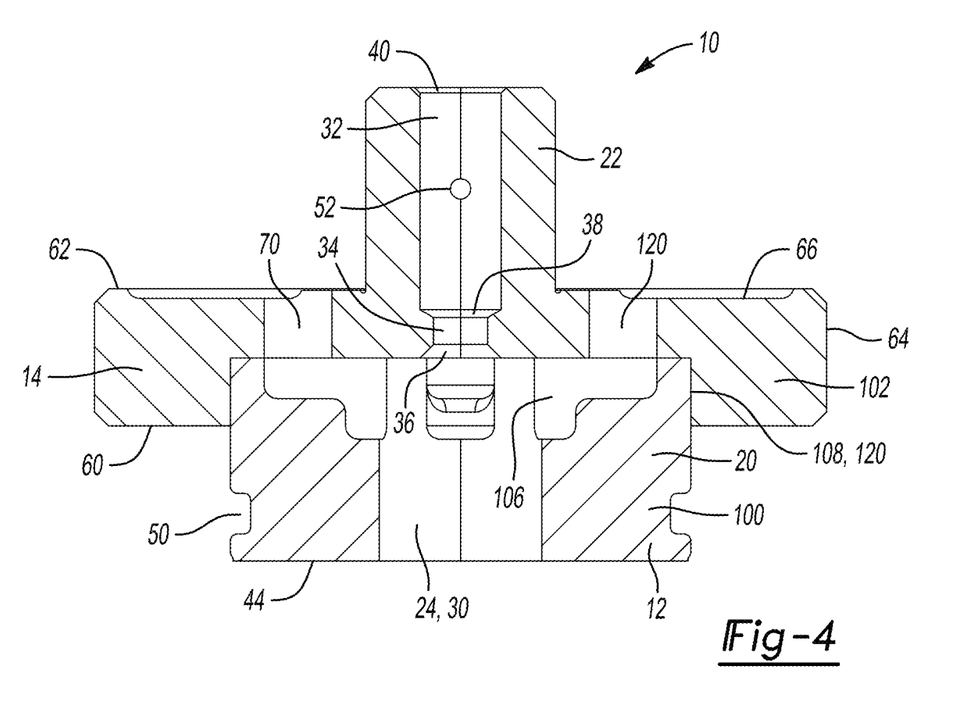
FIG. 4 is a section view taken along the line 4-4 of FIG. 3.
Figure 10:
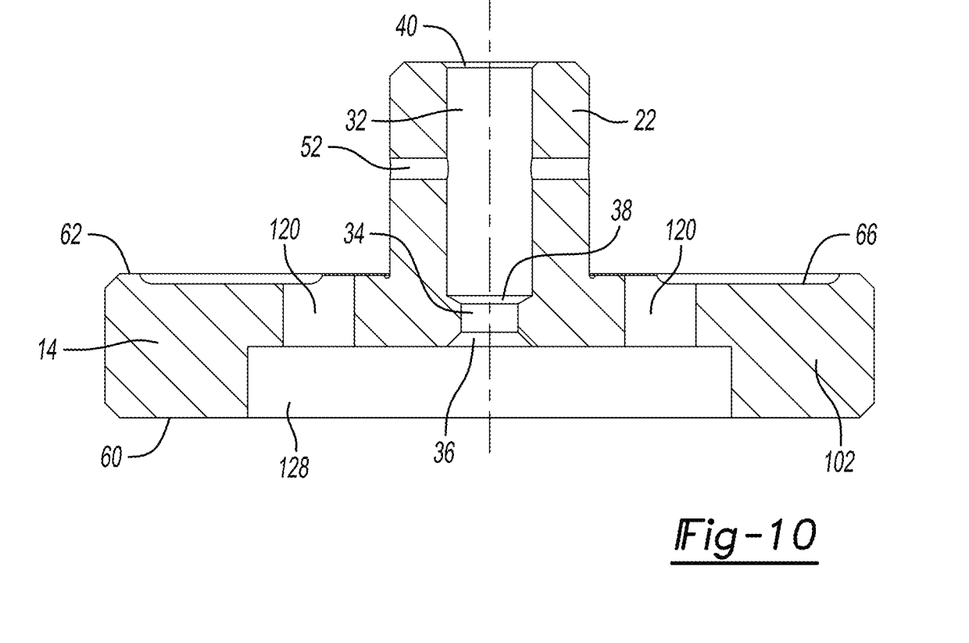
FIG. 10 is a longitudinal section view of a portion of the valve body element of FIG. 1, illustrating a second structure in more detail.

With reference to FIGS. 4 and 10, the second structure 102 forms the second hub portion 22, the remaining portions of the central bore 24 (i.e., the second and third bore portions 32 and 34, the first and second transition portions 36 and 38, and the chamfer portion 40), the flange 14, a plurality of second passage portions 120 and a second joining section 128. In the example provided, the second joining section 128 is a cylindrically-shaped pocket that is formed into the second structure 102 on a side of the flange 14 opposite the second hub portion 22. The second joining section 128 is sized to receive the first joining section 108 on the first structure 100 therein. If desired, the first and second joining sections 108 and 128 can be sized to provide a desired fit, such as a press-fit, to maintain the axial and rotational relationships between the first and second structures 100 and 102 during subsequent processing of the assembly. The second passage portions 120 are equal in number to the first passage portions 106 on the first structure 100 and are configured to be in fluid communication with the first passage portions 106 when the first and second structures 100 and 102 are assembled together. In the example provided, the second passage portions 120 are through-holes formed through the flange 14 along respective axes that are parallel to a longitudinal axis of the second structure 102.

It will be appreciated that the die for forming the second structure 102 can include a die body (not shown) that can be formed in two pieces that can move perpendicular to the longitudinal axis of the second structure 102, as well as a ram (not shown) that is movable along the longitudinal axis of the second structure 102.

If desired, the first and second structures 100 and 102 can be secured to one another through welding (e.g., resistance welding, laser welding), adhesives, brazing, or sinter bonding. Brazing can be accomplished concurrently with sintering, provided a braze filler material is disposed between the first and second joining sections 108 and 128 when the first and second structures 100 and 102 are assembled together.

The foregoing description of the exemplary valve body element has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A valve body element (10) having a central axis (26) and defining a central bore (24), the valve body element comprising:
 a first structure (100) formed of a first compacted powdered metal material, the first structure defining a first hub (12), a first bore portion (30) of the central bore and a plurality of first passage portions (106), the first hub extending along the central axis, the first bore portion of the central bore extending through the first hub and about the central axis, each of the first passage portions being generally L-shaped and having a first leg (110) and a second leg (112), each of the first legs intersecting the first bore portion of the central bore and extends radially outwardly therefrom, each of the second leg (112) extending radially outwardly from an associated one of the first legs, each of the first passage portions intersecting an axial end of the first hub;

a second structure (102) formed of a second compacted powdered metal material, the second structure defining a second hub (22), a flange (14), a second bore portion (32) of the central bore (24), and a third bore portion (34) of central bore (24), the second bore portion extending along the central axis through the second hub, the second hub being fixedly coupled to and extending axially away from a first axial end of the flange, the flange defining a joining section (128) and a plurality of second passage portions (120), the joining section extending through a second axial end of the flange that is opposite the first axial end of the flange, each of the second passage portions intersecting the joining section and extending through the first axial end of the flange;

wherein the first hub is received into the joining section, the first and second structures are fixedly coupled to one another, each of the second passage portions (120) is aligned to a radially outer end of a corresponding one of the second legs of the first passage portions, and the first bore portion is in fluid communication with the second and third passage portions.

2. The valve body element of claim 1, wherein a seal groove is formed into an exterior circumferential surface of the first hub.

3. The valve body element of claim 1, wherein the first and second structures are press-fit together.

4. The valve body element of claim 1, wherein the first and second structures are welded together.

5. The valve body element of claim 1, wherein the first and second structures are adhesively bonded to one another.

6. The valve body element of claim 1, wherein the first and second structures are brazed to one another.

7. The valve body element of claim 1, wherein the first and second structures are sinter bonded to one another.

8. The valve body element of claim 1, wherein each of the second passage portions extends along an axis that is parallel to the central axis.

9. The valve body element of claim 1, wherein the third bore portion is smaller in diameter than the second bore portion.

10. The valve body element of claim 9, wherein the third bore portion is disposed along the central axis between the first and second bore portions.

11. The valve body element of claim 10, wherein the first bore portion is bigger in diameter than the second bore portion.

12. The valve body element of claim 11, wherein a transition portion of the central bore is formed between the first and third bore portions, and wherein the transition portion tapers between the first and third bore portions such that the transition portion diverges from the third bore portion with increasing distance along the central axis from the third bore portion.

13. The valve body element of claim 1, wherein a transition portion of the central bore is formed between the second and third bore portions, and wherein the transition portion tapers between the second and third bore portions.

* * * * *

UNITED STATES PATENT AND TRADEMARK OFFICE
CERTIFICATE OF CORRECTION

| | |
|---|---|
| PATENT NO. | : 11,274,764 B2 |
| APPLICATION NO. | : 17/342709 |
| DATED | : March 15, 2022 |
| INVENTOR(S) | : Daniel R. Bankovic et al. |

It is certified that error appears in the above-identified patent and that said Letters Patent is hereby corrected as shown below:

On the Title Page

Column 1, (65) Prior Publication Data, in Line 1, after "2021" insert --Related U.S. Application Data (60) Provisional application No. 63/044,458, filed on Jun. 26, 2020.--, therefor.

Signed and Sealed this
Twenty-fourth Day of May, 2022

Katherine Kelly Vidal
*Director of the United States Patent and Trademark Office*